US006826030B2

(12) United States Patent
Gorczyca et al.

(10) Patent No.: US 6,826,030 B2
(45) Date of Patent: Nov. 30, 2004

(54) METHOD OF OFFSET VOLTAGE CONTROL FOR BIPOLAR IONIZATION SYSTEMS

(75) Inventors: John Gorczyca, Lansdale, PA (US); David D. Reagan, Wilmington, DE (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/660,001

(22) Filed: Sep. 11, 2003

(65) Prior Publication Data

US 2004/0057190 A1 Mar. 25, 2004

Related U.S. Application Data

(60) Provisional application No. 60/412,237, filed on Sep. 20, 2002.

(51) Int. Cl.$^{7}$ .................................................. H02H 1/00

(52) U.S. Cl. ....................................... 361/212; 361/235

(58) Field of Search ................................ 361/212, 213, 361/235

(56) References Cited

U.S. PATENT DOCUMENTS

| | | | | |
|---|---|---|---|---|
| 2,264,495 A | | 12/1941 | Wilner | |
| 2,879,395 A | | 3/1959 | Walkup | |
| 3,711,743 A | | 1/1973 | Bolasny | |
| 3,714,531 A | | 1/1973 | Takahashi | |
| 3,936,698 A | | 2/1976 | Meyer | |
| 4,092,543 A | | 5/1978 | Levy | |
| 4,423,462 A | | 12/1983 | Antonevich | |
| 4,435,195 A | | 3/1984 | Testone | |
| 4,473,757 A | | 9/1984 | Farago et al. | |
| 4,476,514 A | | 10/1984 | Mykkanen | |
| 4,477,263 A | | 10/1984 | Shaver et al. | |
| 4,528,612 A | | 7/1985 | Spengler | |
| 4,542,434 A | | 9/1985 | Gehlke et al. | |
| 4,630,167 A | | 12/1986 | Huggins | |
| 4,642,728 A | | 2/1987 | Unger | |
| 4,740,862 A | | 4/1988 | Halleck | |
| 4,757,421 A | | 7/1988 | Mykkanen | |
| 4,757,422 A | | 7/1988 | Bossard et al. | |
| 4,785,248 A | | 11/1988 | Mykkanen et al. | |
| 4,809,127 A | | 2/1989 | Steinman et al. | |
| 4,829,398 A | | 5/1989 | Wilson | |
| 4,872,083 A | | 10/1989 | Blitshteyn | |
| 4,878,149 A | | 10/1989 | Stiehl et al. | |
| 4,901,194 A | | 2/1990 | Steinman et al. | |
| 4,951,172 A | | 8/1990 | Steinman et al. | |
| 4,974,115 A | | 11/1990 | Breidegam et al. | |
| 5,008,594 A | | 4/1991 | Swanson et al. | |
| 5,047,892 A | | 9/1991 | Sakata et al. | |
| 5,055,963 A | | 10/1991 | Partridge | |
| 5,057,966 A | | 10/1991 | Sakata et al. | |
| 5,153,811 A | | 10/1992 | Rodrigo et al. | |
| 5,182,466 A | | 1/1993 | Ohkubo | |
| 5,247,420 A | | 9/1993 | Bakhoum | |
| 5,654,542 A | * | 8/1997 | Schubert et al. | 250/282 |
| 5,930,105 A | * | 7/1999 | Pitel et al. | 361/212 |
| 6,130,831 A | * | 10/2000 | Matsunaga | 363/98 |
| 6,252,233 B1 | * | 6/2001 | Good | 250/423 R |
| 6,252,756 B1 | | 6/2001 | Richie, Jr. et al. | |
| 6,632,407 B1 | * | 10/2003 | Lau et al. | 422/186 |
| 6,709,484 B2 | * | 3/2004 | Lau et al. | 95/76 |

* cited by examiner

*Primary Examiner*—Stephen W. Jackson
*Assistant Examiner*—Boris Benenson
(74) *Attorney, Agent, or Firm*—Akin Gump Strauss Hauer & Feld, LLP

(57) ABSTRACT

A method of offset voltage control for pulse mode ionization systems is provided wherein the ionization system has positive and negative power supplies. The duty cycle and overlap of outputs of the positive and negative power supplies are controlled, and an overlap that achieves a desired offset voltage is determined. The offset voltage and the corresponding overlap are stored in memory. The duty cycle and overlap of the outputs of the positive and negative power supplies are controlled to achieve the desired offset voltage based upon the stored offset voltage comparison.

12 Claims, 10 Drawing Sheets

METHOD OF OFFSET VOLTAGE CONTROL FOR BIPOLAR IONIZATION SYSTEMS

CROSS-REFERENCE TO RELATED APPLICATIONS

This application claims the benefit of U.S. Provisional Application 60/412,237, filed Sep. 20, 2002, entitled "Method of Offset Voltage Control for Bipolar Ionization Systems."

BACKGROUND OF THE INVENTION

The present invention relates generally to methods of controlling bipolar ionization systems and, more particularly, to a method of offset voltage control for bipolar pulse mode ionization systems.

Air ionization is the most effective method of eliminating static charges on non-conductive materials and isolated conductors. Air ionizers generate large quantities of positive and negative ions in the surrounding atmosphere which serve as mobile carriers of charge in the air. As ions flow through the air, they are attracted to oppositely charged particles and surfaces. Neutralization of electrostatically charged surfaces can be rapidly achieved through the process.

Air ionization may be performed using electrical ionizers which generate ions in a process known as corona discharge. Electrical ionizers generate air ions through this process by intensifying an electric field around a sharp point until it overcomes the dielectric strength of the surrounding air. Negative corona occurs when electrons are flowing from the electrode into the surrounding air. Positive corona occurs as a result of the flow of electrons from the air molecules into the electrode.

To achieve the maximum possible reduction in static charges from an ionizer of a given output, the ionizer must produce equal amounts of positive and negative ions. That is, the output of the ionizer must be "balanced." If the ionizer is out of balance, the isolated conductor and insulators can become charged such that the ionizer creates more problems than it solves. Ionizers may become imbalanced due to power supply drift, power supply failure of one polarity, contamination of electrodes, or degradation of electrodes. In addition, the output of an ionizer may be balanced, but the total ion output may drop below its desired level due to system component degradation.

A charge plate monitor is typically used to calibrate and periodically measure the actual balance of an electrical ionizer, since the actual balance in the work space may be different from the balance detected by the ionizer's sensor. The charge plate monitor is also used to periodically measure static charge decay time. If the decay time is too slow or too fast, the ion output may be adjusted by increasing or decreasing the preset ion current value. This adjustment is typically performed by adjusting two trim potentiometers (one for positive ion generation and one for negative ion generation) or by adjusting a value stored in software that represents an ion current reference value. Periodic decay time measurements are necessary because actual ion output in the work space may not necessarily be the same as the expected ion output for the ion output current value set in the ionizer.

A room ionization system typically includes a plurality of electrical ionizers connected to a single controller. A conventional room ionization system may include a plurality of ceiling-mounted emitter modules (also, referred to as "pods") connected in a daisy-chain manner by signal lines to a master controller.

Traditionally, a sensor is used in conjunction with a room system or a mini environment ionizer bar to control the offset voltage generated by the ionization system steady state direct current (DC) operation. Steady state DC operation implies constant production of both polarities of ionization from independent positive and negative pins. In this case, the offset voltage is the voltage that would develop on an isolated conductor in the presence of the ionization system. A charge plate monitor is used to determine the offset voltage of the ionization system. Sensors used for this type of application attempt to have essentially infinite input impedances such that they accurately measure offset voltage for negative feedback control of offset voltage. Alternatively, the sensors sample the current produced by the ionizer. Generally, an end user is attempting to control offset voltage to within some threshold critical for the success of their particular process or processes.

Controlling the offset voltage in a given environment is becoming increasingly important. Many modern semiconductor devices/wafers and disk drive heads (giant magnetoresistive or GMR heads) and the like are susceptible to electrostatic discharge (ESD) at lower voltage potentials. For example, such devices may be damaged by voltages around 100V so controlling to 50V or below may be of interest to avoid product losses and malfunctions.

Pulsing systems offer good charge decay times, which are the measure of rate of charge neutralization, and are useful in environments with poor or inadequate airflow. However, most prior art pulsing systems do not attempt to limit offset voltage during pulse mode operation. As a result, pulse times and output levels must carefully be selected to achieve the desired charge decay time without producing excessive offset voltage swing levels. In one such prior art system shown in FIG. 1A, it is very difficult to use long pulse times as they will generate very large offset voltage swings. Offset voltage must be maintained within acceptable limits so that device damage does not occur. The objectionable offset voltage swings generated in a pulse mode system are such that during positive and negative pulses, only one polarity of ionization is provided. The resulting stream of ionization creates swings of offset voltages that can be measured on an isolated conductor. To limit the swing, the end user is forced to adjust the output of the pulse ionization system to a lower level, or select a pulse time that achieves the same result. In either case, charge decay times can become longer which is an undesirable side effect.

FIG. 1B shows that some prior art systems suggest using an "off-time" between pulses of alternate polarities to limit the offset voltage swing. In practice, this technique has several disadvantages. The high voltage power supplies used to provide ionization generally have long time constants associated with them that make a rapid shut down or a realized turn off difficult to attain. In the "off-time" technique, although the input to the high voltage supply is reduced, the output continues to produce ionization and, as a result, there is still a corresponding increase in offset voltage. Further, the duration of the "off-time" that the system uses also reduces the overall ion output of such a system that uses "off-time." Ultimately, ionization systems are installed to produce ions so this is an obvious drawback. Thus, the technique depicted in FIG. 1B has the inherent disadvantage of producing a lower overall ion density in the environment.

What is needed, but not provided by the prior art ionization systems, is a method of controlling the offset voltage generated in pulse mode ionization within user designated limits while having charge decay times that are still adequate or better than adequate. Further, what is needed, but not provided by the prior art ionization systems, is a method of controlling a continuous ionization system in conjunction with a sensor by tracking the sensor alternately for positive and negative setpoints.

BRIEF SUMMARY OF THE INVENTION

Briefly stated, the present system comprises a method of offset voltage control for pulse mode ionization systems, wherein the ionization system has positive and negative power supplies. The method includes controlling the overlap of the outputs of the positive and negative power supplies and determining an overlap that achieves a desired offset voltage. The method also includes storing the offset voltage and the corresponding overlap in memory. The method also includes controlling the duty cycle of the outputs of the positive and negative power supplies to achieve the desired offset voltage based upon the stored offset voltage comparison.

The present invention also comprises a bipolar ionization apparatus that includes a positive high voltage power supply having an output with at least one positive ion emitting electrode connected thereto and configured to generate positive ions and a negative high voltage power supply having an output with at least one negative ion emitting electrode connected thereto and configured to generate negative ions. The bipolar ionization apparatus further includes a controller that is configured to control a duty cycle of the outputs of the positive and negative high voltage power supplies to achieve a desired offset voltage by causing the outputs of the positive and negative high voltage power supplies to overlap by a selected amount of time in excess of zero.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 8:
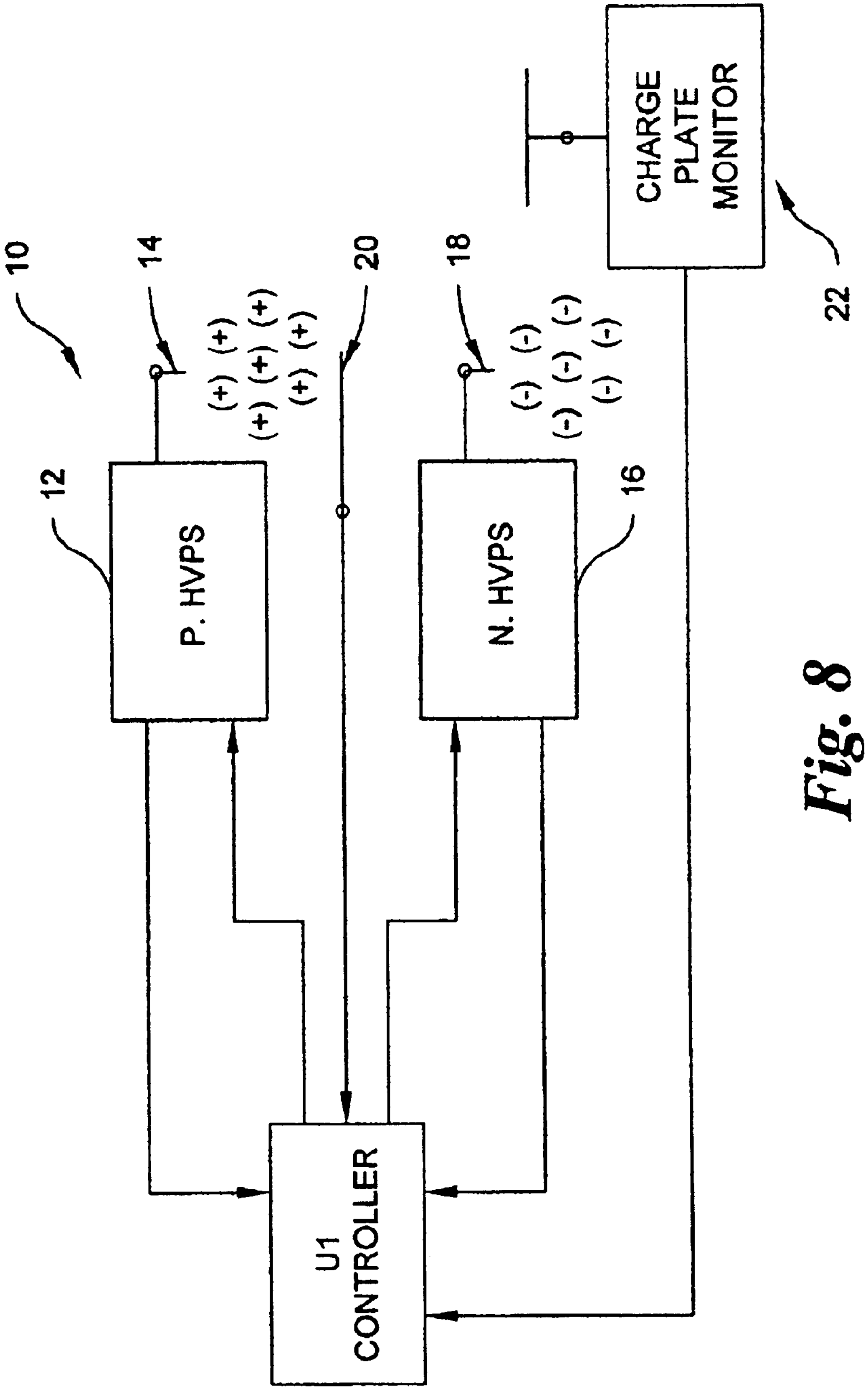
FIG. 8 is a schematic diagram of a generic bipolar ionization system in which the present invention may be applied.

In the drawings, like numerals are used to indicate like elements throughout. Referring the drawings in detail, FIG. 8 shows a schematic diagram of a generic bipolar or dual polarity ionization system 10 in which the present invention may be applied. The ionization system 10 includes a controller U1, a first or positive high voltage power supply (P.HVPS) 12 having an output with at least one positive electrode 14 connected thereto and configured to generate positive ions, and a second or negative high voltage power supply (N.HVPS) 16 having an output with at least one negative electrode 18 connected thereto and configured to generate negative ions. The controller U1 controls the P.HVPS 12 and N.HVPS 16 in either a pulsed mode, alternating the P.HVPS 12 and N.HVPS 16 in an on/off fashion, or in a continuous mode where the level of the input and output of the P.HVPS 12 and N.HVPS 16 are varied based upon feedback or adjustment. The controller U1 is configured to control the outputs of the positive and negative high voltage power supplies P.HVPS 12 and N.HVPS 16 to achieve a desired offset voltage by causing the outputs of the positive and negative high voltage power supplies P.HVPS 12 and N.HVPS 16 to overlap by a selected amount of time in excess of zero. The feedback may be in the form of a measured return current from each respective supply, i.e., the P.HVPS 12 and N.HVPS 16, or from a common sensor 20.

Figure 1A:
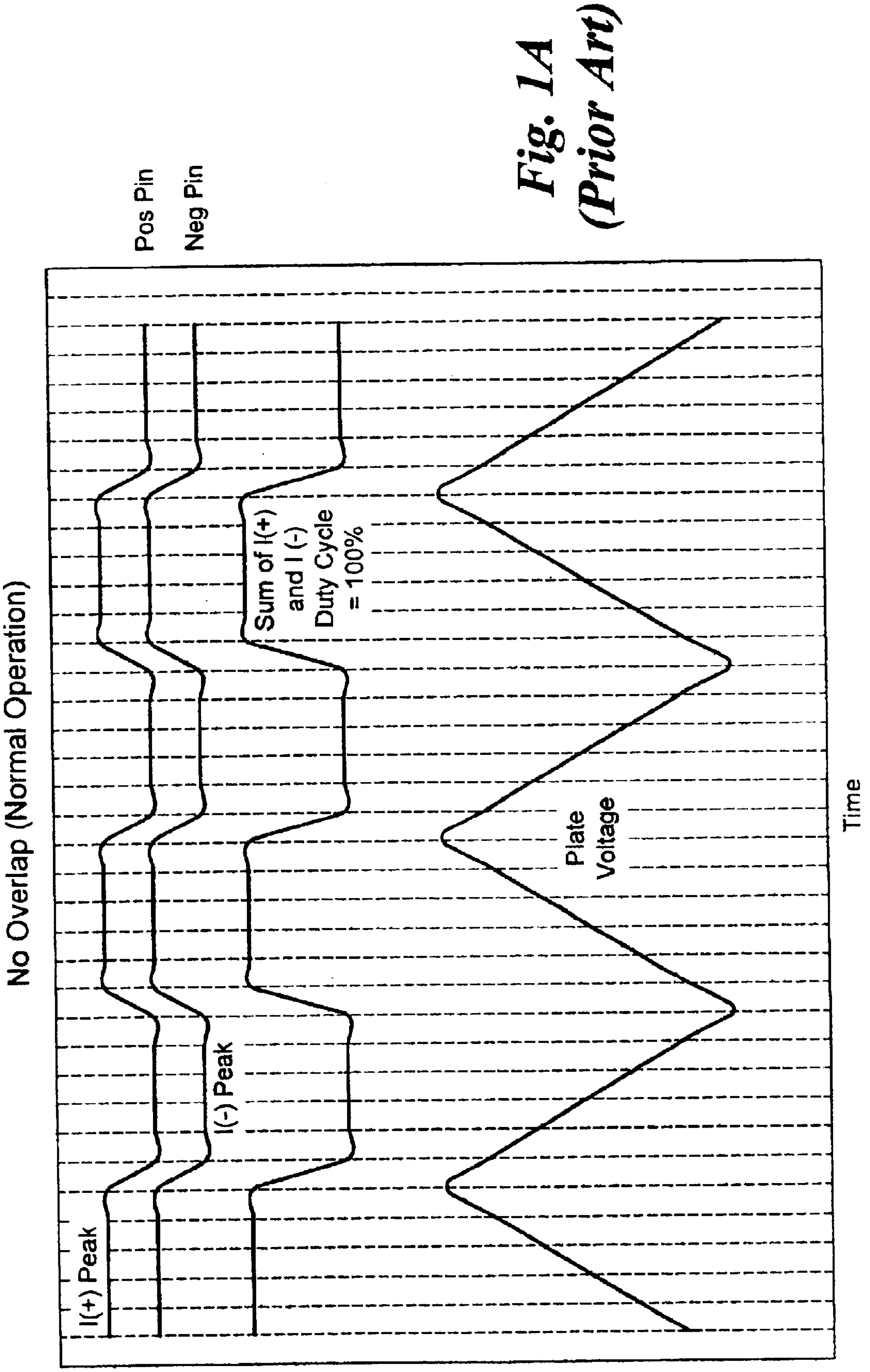
Fig. 1A (Prior Art)
FIG. 1A is a graph of ion generation vs. time vs. controlled pulse mode voltage offset volts of a prior art pulse mode ionization system.
Figure 1B:
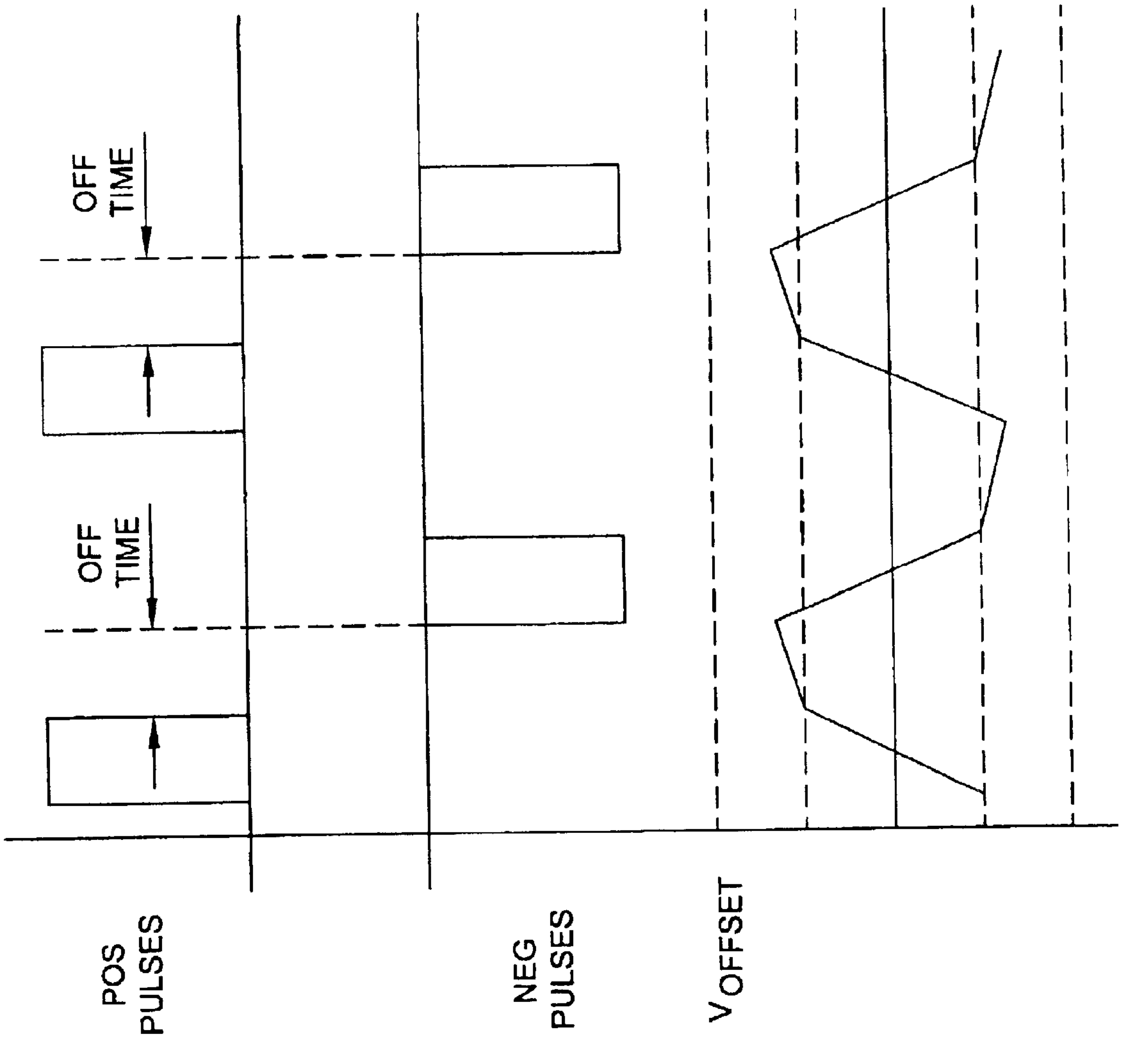
Fig. 1B (Prior Art)
FIG. 1B is a graph and timing chart demonstrating a resultant voltage offset of an off-time type prior art pulse mode ionization system.

In prior art systems, the controller U1 would turn the P.HVPS 12 on while keeping the N.HVPS 16 off, and then switch the P.HVPS 12 off and turn the N.HVPS 16 on, in an alternating fashion with little or no overlap, as depicted in the graph of FIG. 1A. FIG. 1A is a graph of ion generation vs. time and control pulse mode (CPM) voltage offset (Voffset) in volts vs. time. FIG. 1A demonstrates that the CPM Voffset swings are relatively significant.

Figure 2:
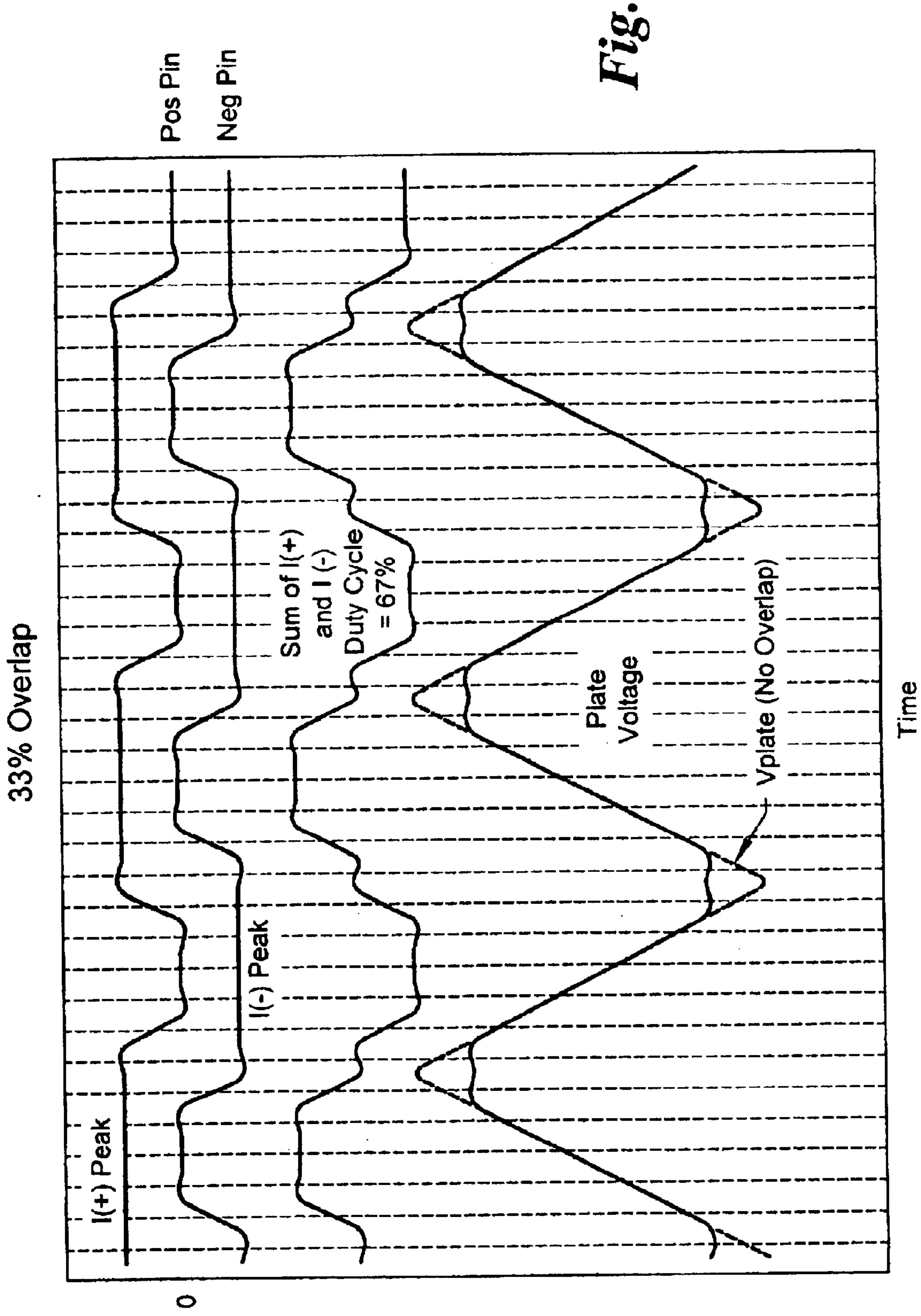
FIG. 2 is a graph of ion generation versus time versus controlled pulse mode voltage offset volts in accordance with a first preferred embodiment of the present invention.

FIG. 2 is a graph of ion generation versus time and CPM Voffset in volts versus time, in accordance with a first preferred embodiment of the present invention. By controlling the overlap of outputs of the P.HVPS 12 and N.HVPS 16, the offset voltage can be maintained within user specifications or user setpoints and charge decay times are improved. The method also includes determining the overlap of the outputs of the P.HVPS 12 and N.HVPS 16 that achieves a desired offset voltage and storing the offset voltage and the corresponding overlap in memory. The method further includes controlling the duty cycle of the outputs of the P.HVPS 12 and N.HVPS 16 to achieve the desired offset voltage based upon the stored offset voltage comparison.

The present invention also includes controlling the overlap based upon an algorithm that uses the comparison of the actual voltage potential to the desired offset voltage. The actual voltage potential in an area surrounding the ionizer system 10 is measured using a sensor 20 and the actual voltage potential is then compared to a user desired offset voltage. The comparison of the actual to the desired offset voltage is used with an algorithm such as time proportioning, proportional/integral/derivative (PID), PI, P, error proportioning and the like, in order to control the overlap.

Pulses of opposite polarity are overlapped as shown in FIG. 2. In the example shown in FIG. 2, the pulses are overlapped by about 33%, thereby having a resultant offset voltage which is less than the prior art system shown in FIG. 1A. Charge delivery from the ionization system can be adjusted so that the offset voltage as measured by a charge plate monitor 22 (FIG. 8) is limited. The offset voltage in CPM is basically the integral of the ion current. FIG. 2 demonstrates that the overlapping of the pulses of opposite polarity results in a zero ("0") integral for the duration of the overlap. As a result, the offset voltage is held steady during the overlap and can be limited to levels deemed acceptable by the end user. Holding the offset voltage steady and at an acceptable level makes it possible to achieve charge decay times not possible with prior art systems such as the one shown in FIG. 1A.

As mentioned above, various offset voltages as measured by the charge plate monitor 22 can be achieved by varying the percentage overlap or duration of the overlap. The second through fourth preferred embodiments demonstrate other variations of the percentage overlap as compared to the first preferred embodiment.

Figure 3:
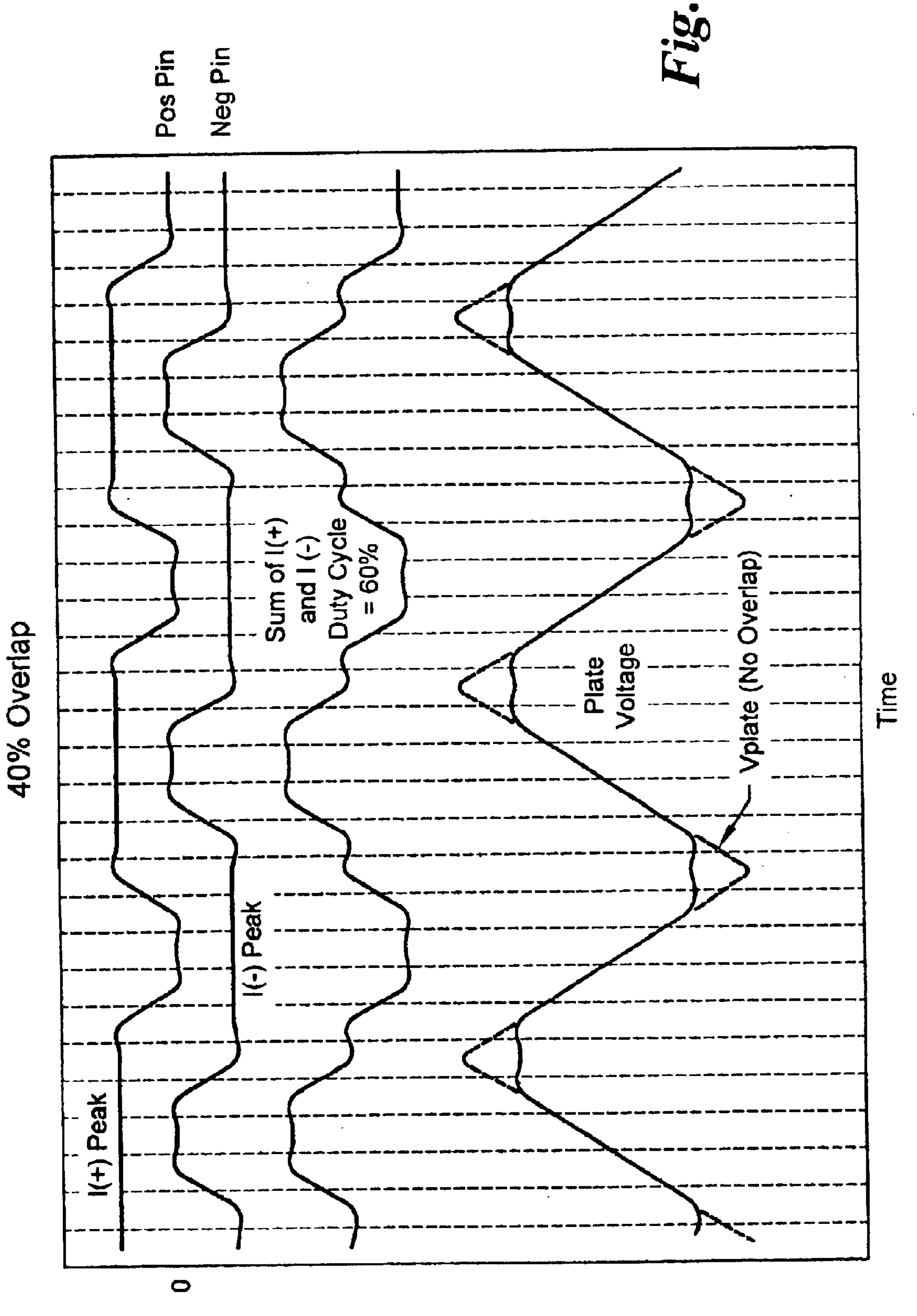
FIG. 3 is a graph showing ion generation versus time versus controlled pulse mode voltage offset volts in accordance with the second preferred embodiment of the present invention.

FIG. 3 is a graph of ion generation versus time versus CPM Voffset in volts in accordance with a second preferred embodiment of the present invention. In the second preferred embodiment, pulses of opposite polarity are overlapped by about 40% thereby having a resultant offset voltage which is less than with the first preferred embodiment.

Figure 4:
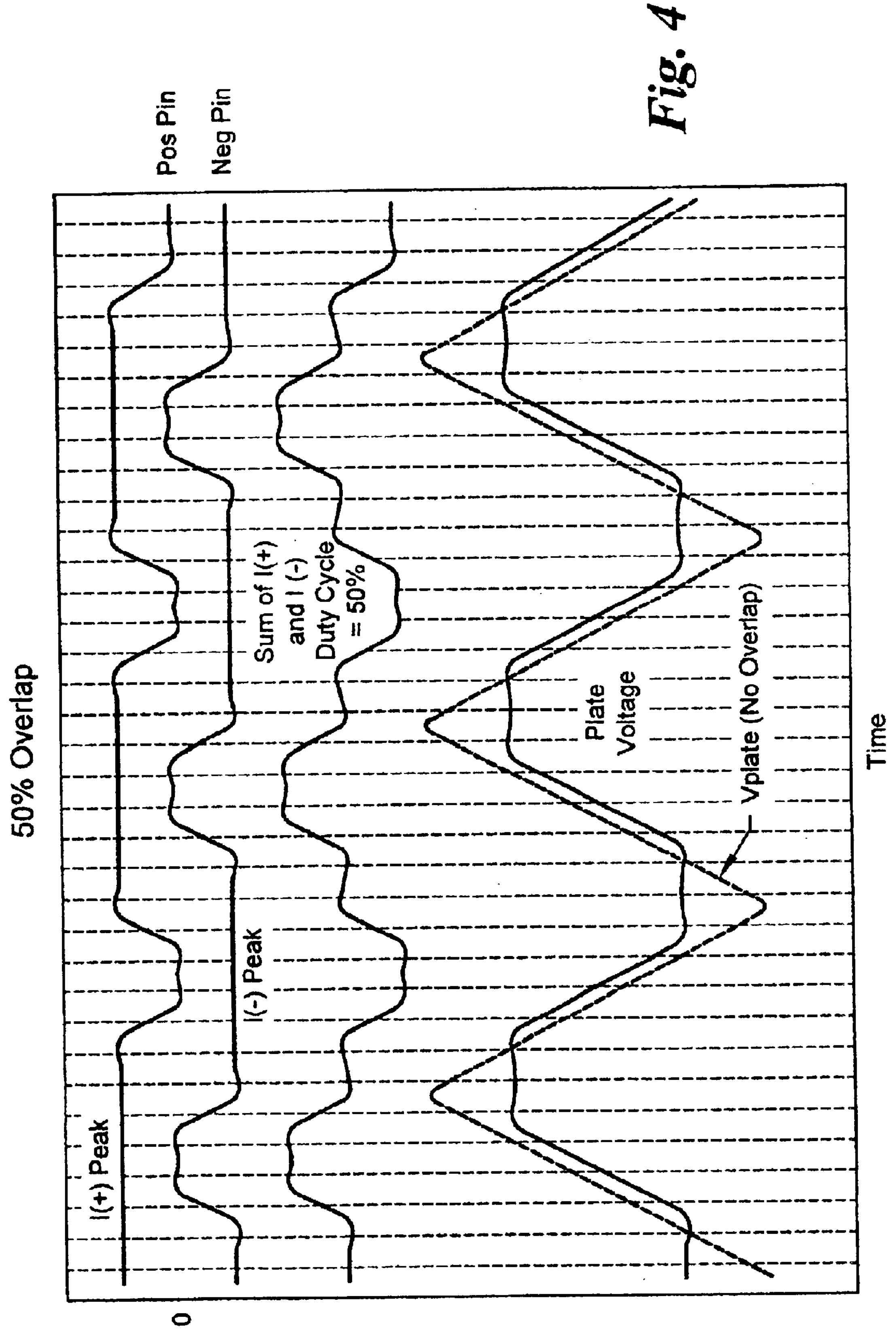
FIG. 4 is a graph showing ion generation versus time versus controlled pulse mode voltage offset volts in accordance with the third preferred embodiment of the present invention.

FIG. 4 is a graph of ion generation versus time versus CPM Voffset in volts in accordance with a third preferred embodiment of the present invention. In the third preferred embodiment, pulses of opposite polarity are overlapped by about 50% thereby having a resultant offset voltage which is less than with the second preferred embodiment.

Figure 5:
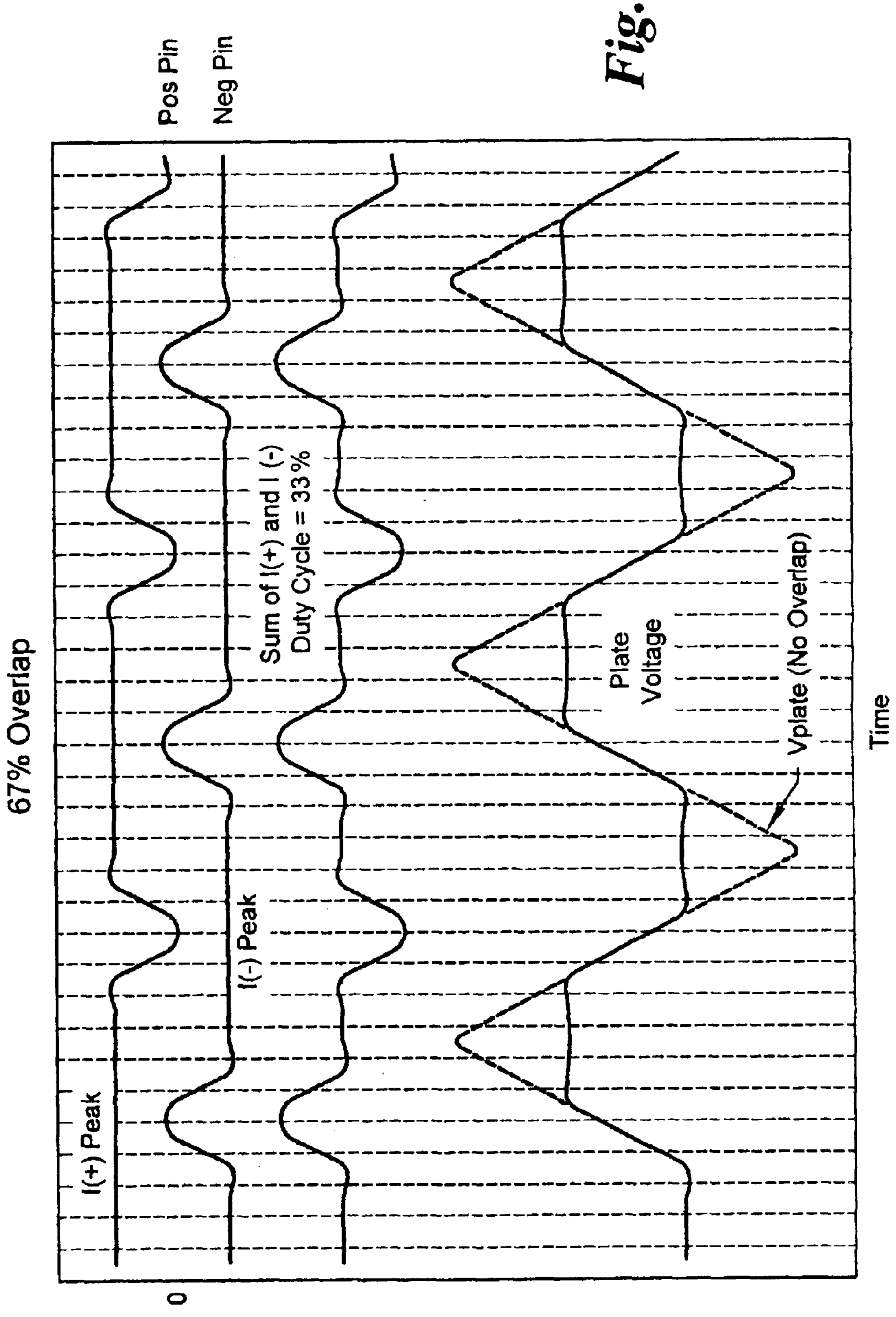
FIG. 5 is a graph showing ion generation versus time versus controlled pulse mode voltage offset volts in accordance with the fourth preferred embodiment of the present invention.

FIG. 5 is a graph of ion generation versus time versus CPM Voffset in volts in accordance with a fourth preferred embodiment of the present invention. In the fourth preferred embodiment, pulses of opposite polarity are overlapped by about 67% thereby having a resultant offset voltage which is less than with the third preferred embodiment.

Other embodiments employing the method of offset voltage control can be used with varying amounts of overlap expressed in either time or percentage without departing from the broad inventive scope herein. Further, the overlap can also be controlled so as to result in a square wave when associated current amplitudes of the power supplies are fixed. Furthermore, the overlap can also be controlled so as to result in one of a θ wave, a square wave, a saw tooth wave and a clipped wave when the amplitudes are variable.

Figure 6A:
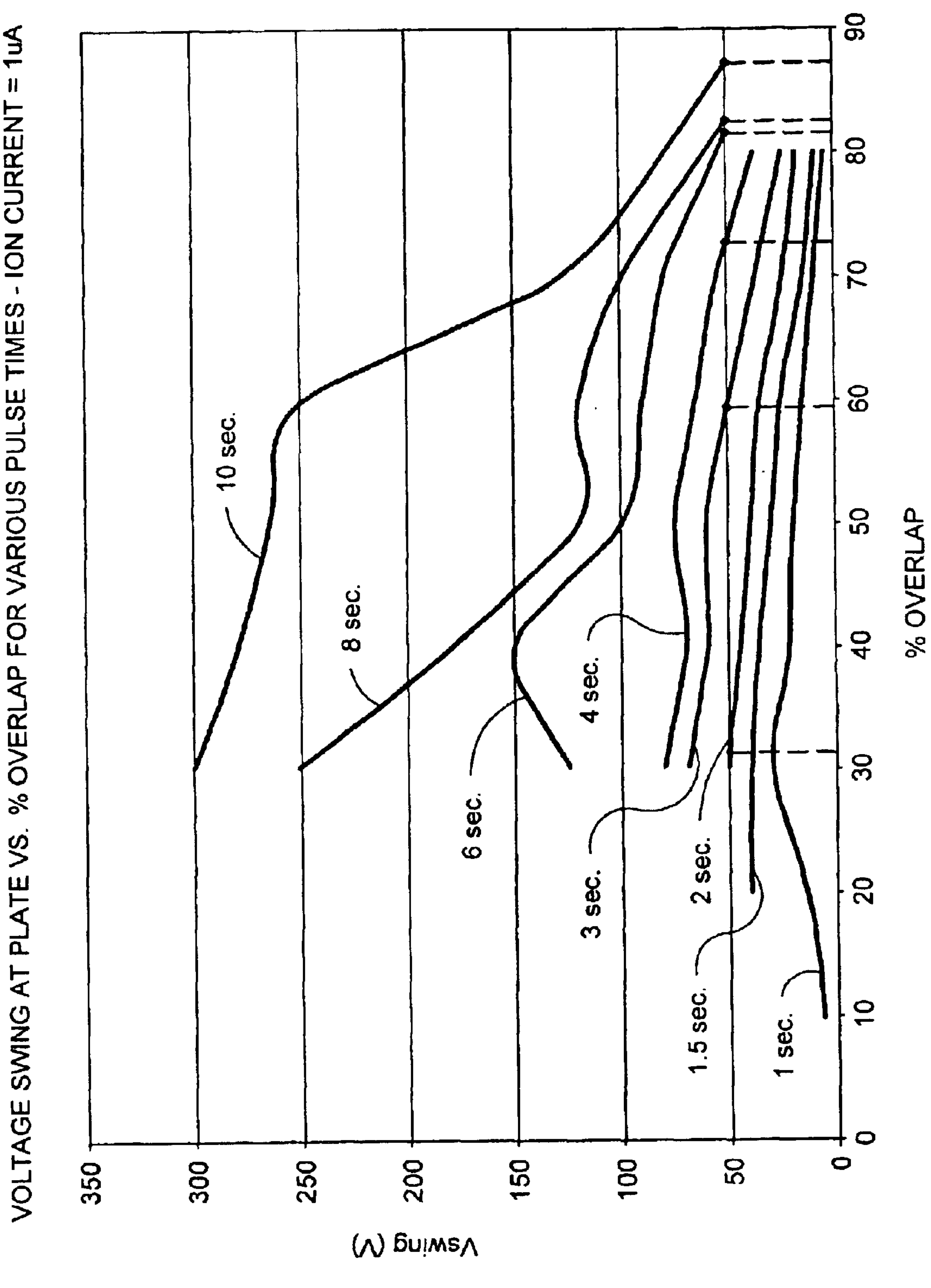
FIG. 6A is a graph comparing voltage swing at a charge plate monitor versus percent overlap for various pulse times in accordance with the present invention.

FIG. 6A is a graph comparing voltage swing at a charge plate monitor 22 versus percent overlap for various pulse times in accordance with the present invention. As shown, a longer pulse time (e.g., 10 seconds) requires a correspondingly longer or increased amount of overlap to control the offset voltage swing. A relatively shorter pulse time (e.g., less than 1 second) may not require any overlap to maintain a low offset voltage swing.

Figure 6B:
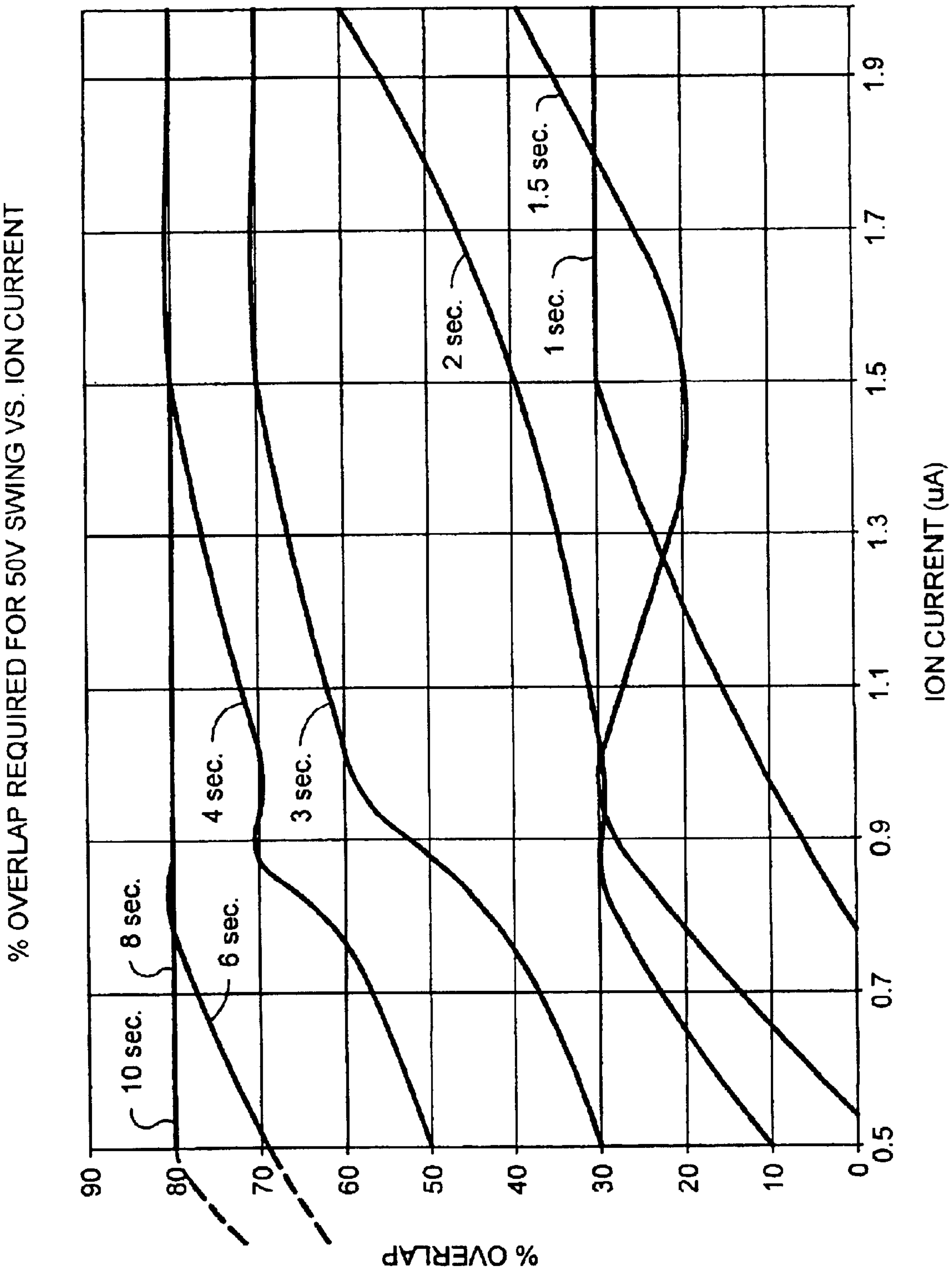
FIG. 6B is a graph comparing percent overlap for a 50V swing versus ion current.

FIG. 6B is a graph comparing percent overlap for a 50V swing versus ion current. As shown, in order to maintain a particular offset voltage limit, in this case 50V, as the ion current is increased a corresponding increase in the percentage of on-time overlap must occur. The relationship between ion current and increase in percentage overlap is non-linear and varies for given pulse times.

Figure 7:
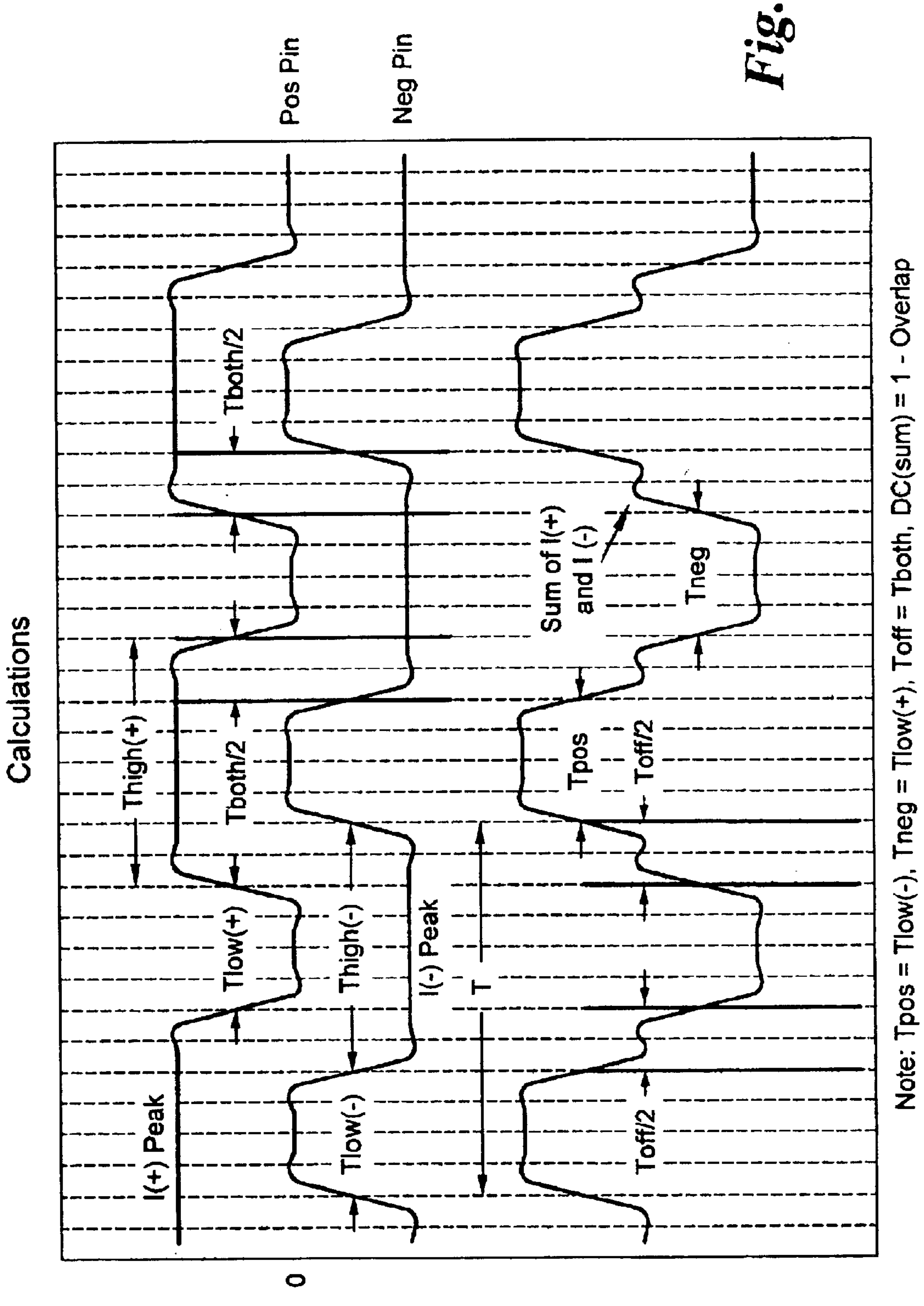
FIG. 7 is a graph demonstrating timing diagrams of duty cycles and calculations in accordance with the preferred embodiments of the present invention.

FIG. 7 includes timing diagrams of duty cycles in accordance with preferred embodiments of the present invention. As used herein, the percentage overlap refers to the percentage of time that both power supplies are turned on ($T_{both}$) compared to the total time for a cycle ($T_{tot}$). For our purposes duty cycle is defined as the time during which the wave is nonzero divided by the total period, T. One can ascertain the percentage of the on time wherein the overlap occurs by a similar calculation. But, the more critical information is the percentage overlap for the total cycle time because increasing the percentage overlap to reduce offset voltage is not intended to change the overall cycle time $T_{tot}$.

Another control approach that obtains a similar net result (amount of overlap) is to not turn off the first polarity power supply, either P.HVPS 12 or N.HVPS 16, when the other polarity power supply is turned on for a period of about ($T_{both}/2$). The first polarity in question is then kept in the off state or low state for a period of $T_{Low}$ (low time) before being turned on again. It is contemplated that the only data that is then required to be stored in memory is $T_{Low}$ and $T_{tot}$ and other values can be calculated therefrom. In this contemplated embodiment, the duty cycle is dependent on the percent overlap of the HVPS 12 and N.HVPS 16. Of course other mathematical or control logic implementations may be utilized without departing from the broad inventive scope of the present invention.

By using the present method of pulse mode control, existing controller-based ionization systems 10 can be updated by downloading to or replacing firmware which controls or supplies a controlling program to the system controller U1. It is contemplated that the present method could be used in other circuits not having controllers by allowing adjustability in the individual power supply control circuits to thereby provide overlapping of the outputs.

In a fifth embodiment of the present invention, both P.HVPS and N.HVPS 12, 16 can be run continuously, i.e., in a steady state DC operation generating a constant supply of both positive and negative ions, in conjunction with the common feedback sensor 20 which is able to track a positive and negative setpoint in an alternating fashion such that a pulsing effect or quasi-pulsing effect is achieved even though both power supplies 12, 16 never shut off. In this case, however, waves of ionization provide both polarities of ionization with a fixed bias of alternating positive and negative content. For example, when the sensor 20 is tracking a positive setpoint, the ionization is biased positive to provide more positive ions to reach the predetermined level, so the positive power supply 12 would likely ramp up and the negative power supply 16 would likely ramp down to try to attain the positive setpoint. Similarly, when the sensor is tracking the negative setpoint, the ionization is biased negative to provide more negative ions to reach the predetermined level, so the positive power supply 12 would likely ramp down and the negative power supply 16 would likely ramp up to try to attain the negative setpoint. In the fifth preferred embodiment, the positive and negative setpoints of the sensor 20 are chosen or calibrated to avoid exceeding a predetermined level as specified by the user, for example +50V (positive setpoint) and −50V (negative setpoint). The sensor 20 may measure ion current to determine the corresponding offset voltage or may be a charge plate monitor or balance sensor which directly measures offset voltage to use as a process variable.

In effect, the fifth preferred embodiment is a dual setpoint, dual output controller that alternates between the two setpoints based on a cycle time. The first setpoint (e.g., the positive setpoint) is selected for a predetermined period of time and the control algorithm tries to reach the first setpoint while measuring the sensor 20 using control techniques that are known in the art such as PID, PI, P, time proportioning, error proportioning and the like. Similarly, the second setpoint (e.g., the negative setpoint) is selected for a similar predetermined period of time and the control algorithm tries to reach the second setpoint while measuring the sensor 20 using similar control techniques. Of course other control techniques and algorithms may be utilized without departing from the present invention.

From the foregoing it can be seen that the present invention comprises a method of offset voltage control for pulse mode ionization systems using overlap of the positive and negative outputs to limit or control the offset voltage. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A bipolar ionization apparatus comprising:

a positive high voltage power supply having an output with at least one positive ion emitting electrode connected thereto and configured to generate positive ions;

a negative high voltage power supply having an output with at least one negative ion emitting electrode connected thereto and configured to generate negative ions; and a controller configured to control a duty cycle of the outputs of the positive and negative high voltage power supplies to achieve a desired offset voltage by causing the outputs of the positive and negative high voltage power supplies to overlap by a selected amount of time in excess of zero.

2. The bipolar ionization apparatus according to claim 1, wherein control of the outputs of the positive and negative high voltage power supplies is modified using pulse duration modulation to obtain a user desired shape of an output wave.

3. The bipolar ionization apparatus according to claim 1, wherein the overlap results in a square wave when associated current amplitudes of the power supplies are fixed.

4. The bipolar ionization apparatus according to claim 1, wherein the overlap results in one of a sine wave, a square wave, a saw tooth wave and a clipped wave when the amplitudes are variable.

5. The bipolar ionization apparatus according to claim 1, wherein the desired offset voltage is adjustable by a user.

6. A bipolar ionization apparatus comprising:

a positive high voltage power supply having a variable output with at least one positive ion emitting electrode connected thereto and configured to generate positive ions;

a negative high voltage power supply having a variable output with at least one negative ion emitting electrode connected thereto and configured to generate negative ions; and a controller configured to continuously control the outputs of the positive and negative high voltage power supplies to achieve a desired offset voltage by varying the outputs of the positive and negative high voltage power supplies to alternately control to a positive setpoint for a predetermined period of time and then to a negative setpoint for another predetermined period of time while continuously outputting both positive and negative ions.

7. A method of controlling an offset voltage of an ionization system, the ionization system including positive and negative high voltage power supplies, each of the power supplies having a respective output with at least one ion emitting electrode connected thereto for generating ions, the method comprising:

controlling a duty cycle of the outputs of the positive and negative high voltage power supplies to achieve a desired offset voltage by causing the outputs of the positive and negative high voltage power supplies to overlap by a selected amount of time in excess of zero.

8. The method according to claim 7, wherein the duty cycle is modified using pulse duration modulation to achieve a user desired shape of the output wave.

9. The method according to claim 7, the overlap results in a square wave when associated current amplitudes of the power supplies are fixed.

10. The method according to claim 7, wherein the overlap results in one of a sine wave, a square wave, a saw tooth wave and a clipped wave when the amplitudes are variable.

11. The method according to claim 7, further comprising the steps of:

determining a particular overlap of the outputs of the positive and negative high voltage power supplies that achieves a particular offset voltage;

storing the particular offset voltage and the corresponding particular overlap in memory; and controlling the duty cycle and the overlap based upon the stored offset voltage and the stored corresponding overlap when the desired offset voltage is approximately equal to the stored offset voltage.

12. The method according to claim 7, further comprising the steps of:

measuring an actual voltage potential in an area surrounding the ionizer;

comparing the actual voltage potential to the desired offset voltage; and controlling the overlap based upon an algorithm that uses the comparison of the actual voltage potential to the desired offset voltage.

* * * * *